United States Patent
Ozawa et al.

(10) Patent No.: US 10,523,030 B2
(45) Date of Patent: Dec. 31, 2019

(54) CHARGE CONTROL METHOD FOR ALKALINE STORAGE BATTERY AND CHARGER FOR ALKALINE STORAGE BATTERY

(71) Applicant: FDK CORPORATION, Tokyo (JP)

(72) Inventors: Natsuki Ozawa, Tokyo (JP); Yoshikazu Izumi, Tokyo (JP); Hiroyuki Ogino, Tokyo (JP); Naoharu Sasayama, Tokyo (JP); Ryou Sakiyama, Tokyo (JP); Mitsuhiro Takei, Tokyo (JP); Thomas A. Wadsworth, Tokyo (JP)

(73) Assignee: FDK CORPORATION, Tokyo (JP)

( * ) Notice: Subject to any disclaimer, the term of this patent is extended or adjusted under 35 U.S.C. 154(b) by 38 days.

(21) Appl. No.: 16/030,723

(22) Filed: Jul. 9, 2018

(65) Prior Publication Data
US 2019/0222030 A1 Jul. 18, 2019

(30) Foreign Application Priority Data

Jan. 12, 2018 (JP) .................................. 2018-003436

(51) Int. Cl.
    *H02J 7/00*     (2006.01)
    *H01M 10/44*     (2006.01)
    *H01M 10/24*     (2006.01)

(52) U.S. Cl.
    CPC ............. *H02J 7/007* (2013.01); *H01M 10/24* (2013.01); *H01M 10/443* (2013.01)

(58) Field of Classification Search
    CPC .............................. H01M 10/443; H02J 7/007
(Continued)

(56) References Cited

U.S. PATENT DOCUMENTS 7,847,522 B2 * 12/2010 Tashiro ............... H01M 10/486
    249/61
8,552,693 B2 * 10/2013 Paryani .................. H02J 7/047
    320/104
(Continued)

FOREIGN PATENT DOCUMENTS

JP     05-343102     12/1993

*Primary Examiner* — Richard V Muralidar
(74) *Attorney, Agent, or Firm* — Kinney & Lange, P.A.

(57) ABSTRACT

A charge control method for an alkaline storage battery includes determining whether or not a temperature T of a battery is less than 0° C.; if the temperature T is equal to or higher than 0° C., determining whether or not the battery has been considered to be charged to a maximum capacity that can be stored in the battery; if the battery has not been considered to be charged to the maximum capacity, determining the temperature T of the battery again; if the battery has been considered to be charged to the maximum capacity, finishing the charging; if it is determined that the temperature T is less than 0° C., determining whether or not a specified voltage value has been reached, the specified voltage value having been preset in a range lower than a voltage value when the battery has been considered to be charged to the maximum capacity that can be stored in the battery; if the voltage value of the battery has not reached the specified voltage value, determining the temperature T of the battery again; and if the voltage value of the battery has reached the specified voltage value, finishing the charging.

2 Claims, 5 Drawing Sheets

(58) Field of Classification Search
USPC .................................................. 320/150, 152
See application file for complete search history.

(56) References Cited

U.S. PATENT DOCUMENTS

| | | | |
|---|---|---|---|
| 9,059,596 B2* | 6/2015 | Chou | H02J 7/0091 |
| 10,074,878 B2* | 9/2018 | Ishishita | H01M 10/443 |
| 2016/0294021 A1* | 10/2016 | Ueno | H01M 10/443 |

* cited by examiner

CHARGE CONTROL METHOD FOR ALKALINE STORAGE BATTERY AND CHARGER FOR ALKALINE STORAGE BATTERY

BACKGROUND

Technical Field

The present invention relates to a charge control method for an alkaline storage battery and a charger for the alkaline storage battery.

Description of the Related Art

An alkaline storage battery is a storage battery that uses an alkaline aqueous solution as an electrolyte solution and is repeatedly usable through charging.

A constant current charging method is used as a charging method for the alkaline storage battery. This charging method continuously supplies a constant current to charge the alkaline storage battery from the start of the charging, and stops the current supply to finish the charging when the alkaline storage battery has been considered to be charged to the maximum capacity that can be stored in the battery. Here, as a method of considering the alkaline storage battery to be charged to the maximum capacity that can be stored in the battery, that is, to be fully charged, there is a known method of detecting a local maximum value of a voltage of the battery (for example, see Japanese Patent Laid-Open No. 5-343102). Moreover, in addition to this method, known methods of considering the alkaline storage battery to be fully charged include a method of detecting that the battery voltage has indicated the local maximum value and has then been reduced by several mV, because when the alkaline storage battery reaches a fully charged state, the voltage of the battery reaches the local maximum value and is then reduced by several mV; a method of detecting that a temperature of the battery has reached a predetermined value, because when the alkaline storage battery reaches the fully charged state, the battery temperature increases; a method of measuring a time required for the alkaline storage battery to reach the fully charged state when the battery is charged with a predetermined current value, thereby previously ascertaining the time required for the full charge, and detecting that a charging time has reached the required time; and the like.

Incidentally, recommended charging of the alkaline storage battery has the battery temperature in a temperature range equal to or higher than 0° C. and equal to or less than 60° C. This is because, first, a temperature higher than 60° C. reduces charging efficiency and also accelerates degradation of materials constituting the battery. In contrast, charging in such a low-temperature environment where the battery temperature becomes less than 0° C. significantly increases gas pressure within the battery as the battery approaches the fully charged state. Since the alkaline storage battery includes a gas emission valve, the increase in the gas pressure within the battery actuates the gas emission valve to emit gas so as to avoid a burst of the battery. Such actuation of the gas emission valve, however, also ejects an alkaline electrolyte solution from the battery along with the gas emission. The ejection of the alkaline electrolyte solution causes a problem of corroded parts around the battery in an apparatus incorporating the battery, and a problem of a shorter life of the battery. For this reason, the charging in such a low-temperature environment where the battery temperature becomes less than 0° C. is not recommended.

Incidentally, various apparatuses incorporating the alkaline storage battery have increasingly wide applications in recent years. Such wide applications lead to more demanding conditions of use of the apparatuses, and also increased usage of the apparatuses in the low-temperature environment. The alkaline storage battery incorporated in the apparatuses is thus also increasingly used in the low-temperature environment.

As described above, however, the charging of the alkaline storage battery at less than 0° C. is not recommended, and the charging in the low-temperature environment less than 0° C. has risks of leakage of the alkaline electrolyte solution and reduction in battery life characteristics.

Consequently, an improved charge control method for the alkaline storage battery is desired in order to avoid the risks as described above.

SUMMARY

According to the present disclosure, a charge control method for an alkaline storage battery is provided. The charge control method includes a temperature determination step of determining whether or not a temperature T of a battery is less than 0° C.; a first charging step of, if it is determined in the temperature determination step that the temperature T is equal to or higher than 0° C., supplying a constant current to the battery to charge the battery; a full charge determination step of determining whether or not the battery being charged in the first charging step has been considered to be charged to a maximum capacity that can be stored in the battery; a second charging step of, if it is determined in the temperature determination step that the temperature T is less than 0° C., supplying the constant current to the battery to charge the battery; and a specified voltage value determination step of determining whether or not a voltage value of the battery being charged in the second charging step has reached a specified voltage value, the specified voltage value having been preset in a range lower than the voltage value when the battery has been considered to be charged to the maximum capacity that can be stored in the battery, wherein if it is determined in the full charge determination step that the battery has not been considered to be charged to the maximum capacity that can be stored in the battery, the method returns to the temperature determination step to determine the temperature T again, and if it is determined that the battery has been considered to be charged to the maximum capacity that can be stored in the battery, the method stops the current supply to finish the charging; and if it is determined in the specified voltage value determination step that the voltage value of the battery has not reached the specified voltage value, the method returns to the temperature determination step to determine the temperature T again, and if it is determined that the voltage value of the battery has reached the specified voltage value, the method stops the current supply to finish the charging.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

A procedure for charging an alkaline storage battery with a charger for the alkaline storage battery (hereinafter referred to as "charger 1"), which uses a charge control method for the alkaline storage battery according to the present disclosure, will be described below with reference to the drawings.

First, a nickel-metal-hydride storage battery, which is a kind of the alkaline storage battery, is prepared as a target to be charged. This nickel-metal-hydride storage battery is not specifically limited, and a typical nickel-metal-hydride storage battery is used.

The prepared nickel-metal-hydride storage battery (hereinafter referred to as "battery 2") is set in the charger 1.

Figure 1:
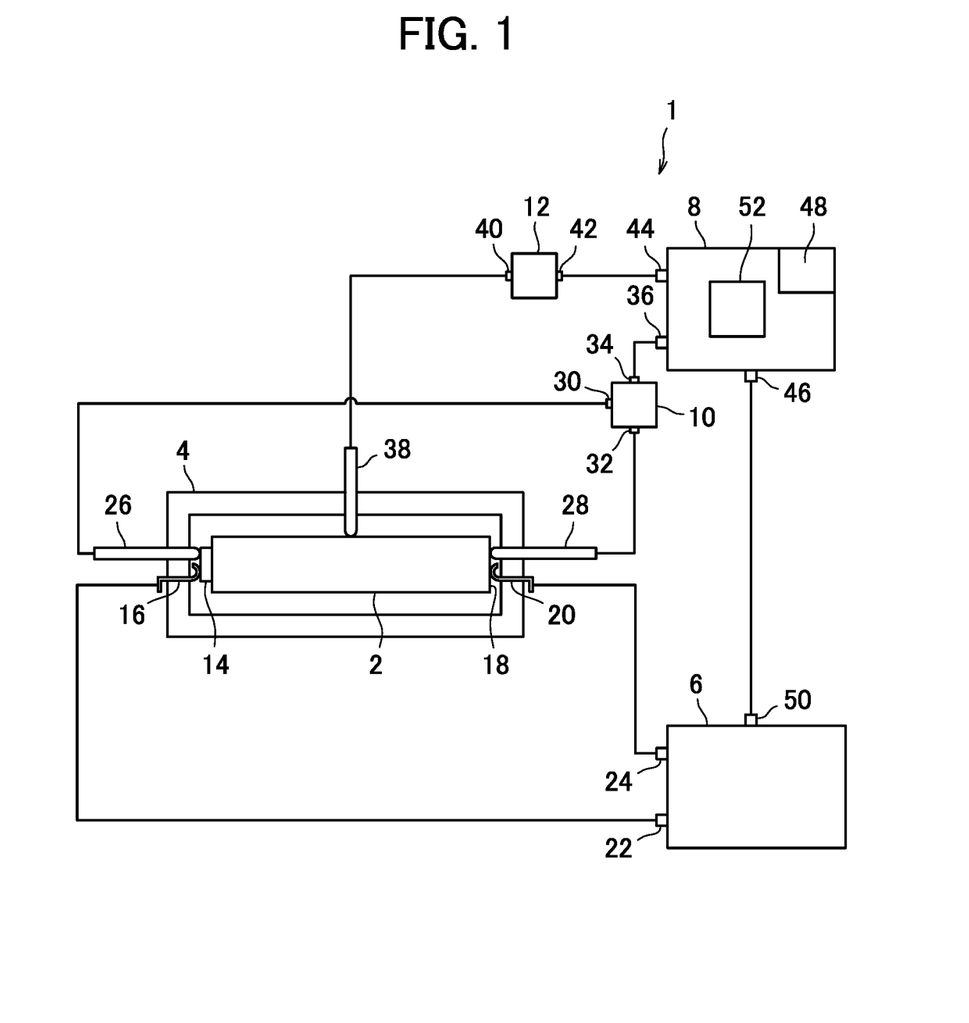
FIG. 1 is a block diagram schematically illustrating a configuration of a charger for an alkaline storage battery according to an embodiment of the present invention.

Here, as illustrated in FIG. 1, the charger 1 includes a battery holder 4 that holds the battery 2; a power source unit 6 that supplies a current for charging to the battery 2 in order to charge the battery 2 held in the battery holder 4; a control unit 8 that controls operations of the power source unit 6; a voltage meter (voltage measurement unit) 10 that measures a voltage value of the battery 2; and a temperature sensor (temperature measurement unit) 12 that measures a temperature of the battery 2.

In the battery holder 4, a positive-electrode-side contact terminal 16 in contact with a positive electrode terminal 14 of the battery 2, and a negative-electrode-side contact terminal 20 in contact with a negative electrode terminal 18 of the battery 2 are disposed. The positive-electrode-side contact terminal 16 is electrically connected to a positive-electrode-side output terminal 22 of the power source unit 6 via a lead wire, and the negative-electrode-side contact terminal 20 is electrically connected to a negative-electrode-side output terminal 24 of the power source unit 6 via the lead wire. The power source unit 6 can thereby supply the current for charging to the battery 2 held in the battery holder 4. Here, the power source unit 6 has a control signal input terminal 50 to receive control signals for controlling its operations from the control unit 8.

Also in the battery holder 4, a positive-electrode-side probe 26 in contact with the positive electrode terminal 14 of the battery 2, and a negative-electrode-side probe 28 in contact with the negative electrode terminal 18 of the battery 2 are disposed at predetermined positions in order to measure a voltage of the battery 2. The positive-electrode-side probe 26 is then electrically connected to a positive-electrode-side input terminal 30 of the voltage meter 10 via the lead wire, and the negative-electrode-side probe 28 is electrically connected to a negative-electrode-side input terminal 32 of the voltage meter 10 via the lead wire.

The voltage meter 10 is not specifically limited, and a typical voltage meter capable of measuring the voltage of the battery 2 may be used. This voltage meter 10 has a voltage value output terminal 34 that outputs information on the measured voltage value of the battery 2.

Moreover, within the battery holder 4, a temperature measurement probe 38 is disposed, for example, in contact with a side of the battery 2, in order to measure the temperature of the battery 2. The temperature measurement probe 38 is electrically connected to a temperature input terminal 40 of the temperature sensor 12 via the lead wire.

The temperature sensor 12 is not specifically limited, and a typical temperature sensor capable of measuring the temperature of the battery 2 may be used. This temperature sensor 12 has a temperature output terminal 42 that outputs information on the measured temperature of the battery 2.

The control unit 8 includes a voltage value input terminal 36 electrically connected to the voltage value output terminal 34 of the voltage meter 10 via the lead wire; a temperature input terminal 44 electrically connected to the temperature output terminal 42 of the temperature sensor 12 via the lead wire; a control signal output terminal 46 that is electrically connected to the control signal input terminal 50 of the power source unit 6 via the lead wire, and outputs the control signals for controlling the operations of the power source unit 6; and an arithmetic processing unit 52 that performs arithmetic processing based on the information on the temperature of the battery 2 from the temperature sensor 12, and the information on the voltage value of the battery 2 from the voltage meter 10. It should be noted that a preferred aspect of the control unit 8 further includes a timer 48 that measures a charging time of the battery 2 to calculate data of the charging time.

A charge control method of charging the battery 2 with the charger 1 according to the present disclosure will be described next with a flowchart of FIG. 2.

Figure 2:
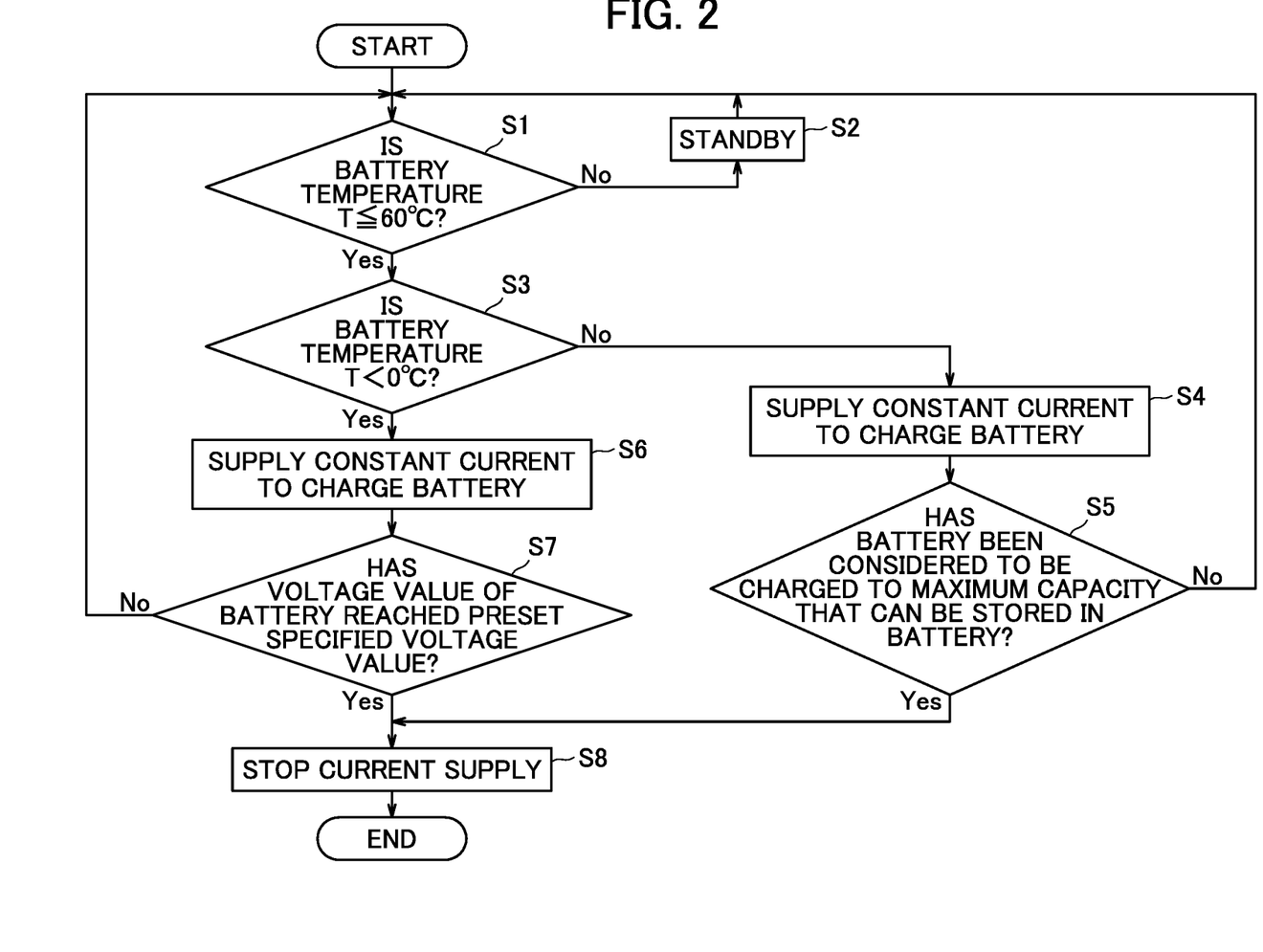
FIG. 2 is a flowchart of a charge control method for the alkaline storage battery according to an embodiment of the present invention.

As illustrated in FIG. 2, the control is started in a state of the battery 2 set in the charger 1, and in step S1, the control unit 8 determines whether or not a temperature T of the battery 2 is in a predetermined temperature range, based on a value of the temperature T of the battery 2 measured in the temperature sensor 12. Here, the upper limit of the predetermined temperature range may preferably be equal to or less than 60° C. This is because a temperature higher than 60° C. reduces charging efficiency for the alkaline storage battery, and also accelerates degradation of materials constituting the battery. In step S1, it is determined whether or not the temperature T of the battery 2 is in a range of T≤60° C. If the temperature T of the battery 2 is not in this temperature range, the method proceeds to step S2, where this charging task is put into a standby state. It should be noted that the determination in step S1 is repeatedly performed at each elapse of a predetermined time.

If it is determined in step Si that the temperature T of the battery 2 is in the range of T≤60° C., the method proceeds to step S3. In this step S3, it is determined whether or not the temperature T of the battery 2 is in a low-temperature region of T<0° C. Then, if the control unit 8 determines that the temperature T of the battery 2 is not in a range of T<0° C., the method proceeds to step S4.

In step S4, the charging is performed with a constant current. Specifically, a control signal instructing to supply the constant current to the battery 2 is output from the control unit 8 to the power source unit 6, and the charging is performed with the constant current.

Next, it is determined in step S5 whether or not the battery 2 has been considered to be charged to the maximum capacity that can be stored in the battery 2.

A method of determining whether or not the battery 2 has been considered to be charged to the maximum capacity that can be stored in the battery 2 includes a method as follows.

As the battery 2 is charged with the constant current, when the battery 2 has been charged to the maximum capacity that can be stored in the battery 2, the voltage value of the battery 2 indicates the local maximum and is then reduced by several mV. Thus, the battery 2 can be considered to be charged to the maximum capacity that can be stored in the battery 2, by capturing a phenomenon of the voltage value of the battery 2 indicating the local maximum, and a phenomenon of the voltage value being reduced after the indication of the local maximum. Specifically, the battery 2 can be considered to be charged to the maximum capacity that can be stored in the battery 2, by measuring the voltage of the battery 2 with the voltage meter 10 to ascertain a transition of the voltage value, and detecting that the voltage of the battery 2 has reached the maximum value and has then been reduced from this maximum value by 5 to 10 mV.

Moreover, another method includes a method of determination with the temperature of the battery 2.

As the battery 2 is charged with the constant current, when the battery 2 has been charged nearly to the maximum capacity that can be stored in the battery 2, the temperature of the battery 2 begins to increase. Thus, the battery 2 can be considered to be charged to the maximum capacity that can be stored in the battery 2, by capturing a change in the temperature of the battery 2. Specifically, the battery 2 can be considered to be charged to the maximum capacity that can be stored in the battery 2, by measuring the temperature of the battery 2 with the temperature sensor 12 to ascertain a transition of the temperature, and detecting a point where a rate of increase in the temperature of the battery 2 becomes high.

Furthermore, another method includes a method of determination with an elapsed time of the charging.

The battery 2 can be considered to be charged to the maximum capacity that can be stored in the battery 2, by charging the battery 2 with the constant current, previously ascertaining a charge completion time required for the battery 2 to be charged to the maximum capacity that can be stored in the battery 2, and detecting that the elapsed time of the charging has reached this charge completion time. Specifically, the battery 2 can be considered to be charged to the maximum capacity that can be stored in the battery 2, at a time point when the elapsed time has reached the above described charge completion time, by measuring the time elapsed since the start of the charging with the timer 48.

As described above, it is determined in step S5 whether or not the battery 2 has been considered to be charged to the maximum capacity that can be stored in the battery 2.

In step S5, if it is determined that the battery 2 has not been considered to be charged to the maximum capacity that can be stored in the battery 2, the method returns to step S1, where the temperature T of the battery 2 is determined again, and then the charging is performed with the constant current.

Subsequently, as the charging proceeds, if it is determined in step S5 that the battery 2 has been considered to be charged to the maximum capacity that can be stored in the battery 2, the method proceeds to step S8, where the current supply is stopped. Specifically, a control signal instructing to stop the current supply to the battery 2 is output from the control unit 8 to the power source unit 6, and the current supply is stopped. As a result, the charging is finished. It should be noted that the determination in step S5 is repeatedly performed at each elapse of a predetermined time.

In contrast, if it is determined in step S3 that the temperature T of the battery 2 is in the range of T<0° C., the method proceeds to step S6. Then in step S6, the charging is performed with the constant current. Specifically, the control signal instructing to supply the constant current to the battery 2 is output from the control unit 8 to the power source unit 6, and the charging is performed with the constant current.

Next, it is determined in step S7 whether or not the voltage value of the battery 2 has reached a specified voltage value that has been preset.

Specifically, the information on the voltage value of the battery 2 obtained from the voltage meter 10 is provided to the control unit 8, the voltage value of the battery 2 is compared with the preset specified voltage value, and thereby it is determined whether or not the specified voltage value has been reached.

In step S7, if it is determined that the voltage value of the battery 2 has not reached the specified voltage value, the method returns to step S1, where the temperature T of the battery 2 is determined again, and then the charging is performed with the constant current. Subsequently, as the charging proceeds, if it is determined in step S7 that the voltage value of the battery 2 has reached the specified voltage value, the method proceeds to step S8, where the current supply is stopped. Specifically, the control signal instructing to stop the current supply to the battery 2 is output from the control unit 8 to the power source unit 6, and the current supply is stopped. As a result, the charging is finished. It should be noted that the determination in step S7 is repeatedly performed at each elapse of a predetermined time.

Here, a method of setting the specified voltage value will be described.

First, the battery 2 is previously charged in a low-temperature environment less than 0° C. A relationship between the voltage value of the battery 2 and the charging time is then obtained, and a voltage transition curve is obtained as a result thereof. The voltage transition curve typically rises with a sharp slope in an initial charging stage as a first stage, and then transitions with a slope shallower than the initial charging stage for some time as a second stage. Subsequently, when the battery 2 approaches a so-called fully charged state where the battery 2 is charged to the maximum capacity that can be stored in the battery 2, the slope of the voltage transition curve becomes sharp again as a third stage. Then in a final charging stage, the slope of the voltage transition curve becomes shallow again as a fourth stage.

The specified voltage value is set to a value lower than the maximum voltage value in a region of the fourth stage where the slope of the voltage transition curve becomes shallow again as described above. In this state of the voltage value lower than the maximum voltage value, which is the state prior to a state where the battery 2 has been charged to the maximum capacity that can be stored in the battery 2, gas pressure thus does not significantly increase within the battery 2, and a gas emission valve is not actuated either.

Moreover, this specified voltage value may preferably be set to a voltage value corresponding to a region where the slope of the voltage transition curve becomes sharp again as the third stage as described above. This is because this region is certainly in a state before the full charge, and in addition, this region has proceeded to a certain level of charging, where a certain level of capacity can be secured for use of the battery 2, even before the full charge.

Here, in the case of the typical nickel-metal-hydride storage battery, the specified voltage value may preferably be set to be equal to or larger than 1.50 V and equal to or less than 1.55 V, for the charging in the low-temperature environment less than 0° C. This is because the battery in this range is put into a state where the charging has proceeded so that the certain level of capacity can be secured, even before the full charge.

The present disclosure provides a charge control method of switching between charging methods in the case of the battery temperature equal to or higher than 0° C. and in the case of the battery temperature less than 0° C., as well as a charger using this charge control method, as described above. In the case of the battery temperature equal to or higher than 0° C., the significant increase in the gas pressure within the battery is unlikely to occur even near the fully charged state in the charging. Accordingly, a charge control method of performing the charging to normal full charge is employed. In contrast, in the case of the battery temperature less than 0° C. in the low-temperature environment, the significant increase in the gas pressure within the battery occurs near the fully charged state in the charging, and leakage of an alkaline electrolyte solution occurs with the actuation of the gas emission valve, leading to reduction in life characteristics. According to the charge control method of the present disclosure, however, in the case of the battery temperature less than 0° C., the charging is not performed to the full charge, but is finished at a time point when the preset specified voltage value has been reached before the fully charged state. This enables successful charging in a state where occurrence of risks, such as the leakage of the alkaline electrolyte solution with the actuation of the gas emission valve, and the reduction in the life characteristics therewith, is suppressed even in the low-temperature environment. Consequently, according to the present disclosure, the charging in a temperature range wider than the conventional case can be accommodated.

Moreover, according to the charge control method in accordance with the present disclosure, as described above, if it is determined in step S5 that the battery 2 has not been considered to be charged to the maximum capacity that can be stored in the battery 2, the method returns to step S1, and the temperature T of the battery 2 is determined again in steps S1 and S3. Moreover, if it is determined in step S7 that the voltage value of the battery 2 has not reached the specified voltage value, the method returns to step S1, and the temperature T of the battery 2 is determined again in steps S1 and S3. Accordingly, even if the temperature T of the battery 2 changes due to variation in ambient temperature or the like at some time in the charging task, the determination in step S1 puts the charging task into the standby state, and the determination in step S3 changes the charging method. For example, if it is determined in step S3 that the temperature T of the battery 2 is equal to or higher than 0° C., and the charging method of supplying the constant current until the battery 2 has been considered to be fully charged is selected, the control is repeated in an order of steps S5, S1, S3, S4, and S5 until completion of the charging unless the temperature T changes. Lastly, when it is determined in step S5 that the battery 2 has been considered to be fully charged, the method proceeds to step S8, where the charging is finished. Here, if the ambient temperature is reduced at some time in the charging task, and the temperature T of the battery 2 becomes less than 0° C., the control is changed in step S3 to flow to steps S6 and S7. This can stop the charging at the time point when the voltage value of the battery 2 has reached the specified voltage value, and can avoid the occurrence of the risks in the charging in the low-temperature environment.

In this way, the temperature of the battery 2 can be monitored even during the charging, and even if the temperature of the battery 2 has changed due to the variation in the ambient temperature or the like, the charging method can be changed according to the determination in step S3. In other words, according to the present disclosure, it is possible to provide the charge control method for the alkaline storage battery and the charger for the alkaline storage battery using this charge control method, which can more flexibly accommodate the charging in the temperature range wider than conventional charging methods.

In the charging in such a low-temperature environment less than 0° C., the charge control method for the alkaline storage battery according to the present disclosure stops the current supply for the charging at the time point when the voltage value of the battery has reached the specified voltage value, and finishes the charging. Consequently, since the charging is stopped before the gas pressure within the battery significantly increases to actuate the gas emission valve, the gas emission valve is not opened in the charging in the low-temperature environment. As a result, the occurrence of the risk with the leakage of the alkaline electrolyte solution is suppressed.

Consequently, according to the present disclosure, the successful charging can be performed in the state where the occurrence of the risks is suppressed even in the low-temperature environment, and it is thus possible to provide the charge control method for the alkaline storage battery and the charger for the alkaline storage battery, which can accommodate the charging in the temperature range wider than the conventional case.

Examples (1) Setting of Specified Voltage Value

A nickel-metal-hydride storage battery of ⅘ SC size (with a nominal capacity of 3250 mAh) has been prepared. This battery has been charged with a charging current of 0.05 C for 32 hours in environments at respective temperatures of −30° C., −20° C., −10° C., −5° C., 0° C., 25° C. and 60° C. The relationship between the voltage of the battery and the charging time has then been obtained. A graph of a result thereof has been illustrated in FIG. 3. From this FIG. 3, voltage transition curves in respective temperature conditions have been obtained.

Figure 3:
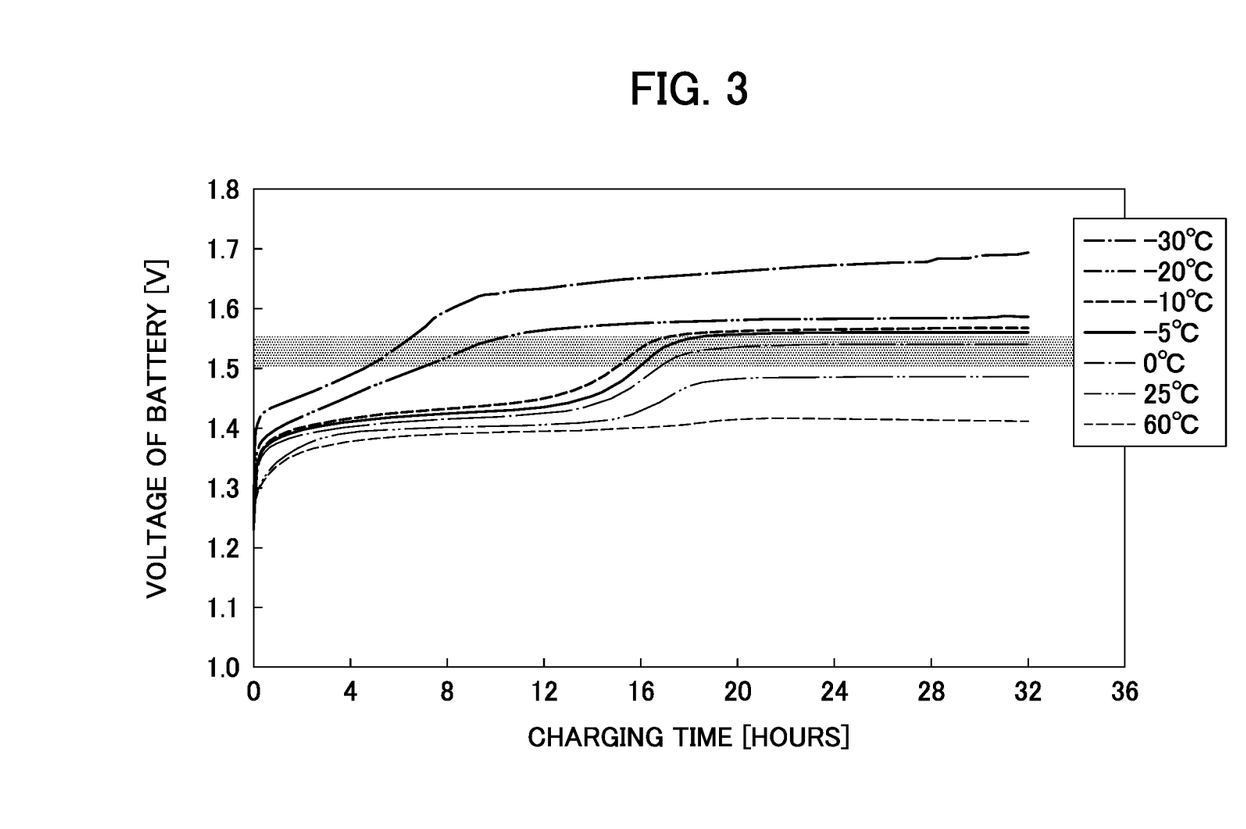
FIG. 3 is a graph illustrating a relationship between a voltage of the battery and a charging time in each charging in environments at respective temperatures of −30° C., −20° C., −10° C., −5° C., 0° C., 25° C. and 60° C.

The respective voltage transition curves at −30° C., −20° C., −10° C., and −5° C. in the charging in the low-temperature environment less than 0° C. have been observed. From these voltage transition curves, the lowest voltage of the battery corresponding to the fourth stage, which is the final charging stage where the slope becomes shallow again, is 1.55 V in the condition of −5° C. Consequently, in the above described low-temperature environment, in a state of the voltage value lower than 1.55 V, which is the state prior to the state where the battery 2 has been charged to the maximum capacity that can be stored in the battery 2, the gas pressure thus does not significantly increase within the battery 2, and the actuation of the gas emission valve can be avoided.

Moreover, the voltage corresponding to the third stage close to the fully charged state, where the slope of the voltage transition curve becomes sharp again, is 1.50 V throughout the respective conditions of −30° C., −20° C., −10° C., and −5° C. Consequently, in the above described low-temperature environment, in a state of the voltage value equal to or larger than 1.50 V, the charging has proceeded to the certain level, where the capacity for use of the battery 2 can be secured even before the full charge.

As described above, it has been ascertained that the specified voltage value may preferably be set to be equal to or larger than 1.50 V and equal to or less than 1.55 V (a shaded range in FIG. 3). It should be noted that this specified voltage value may be different depending on constituent materials of the battery or the like.

(2) Charging According to Charge Control Method with Specified Voltage Value Set to 1.50 V

(i) Example 1

The nickel-metal-hydride storage battery of ⅘ SC size (with the nominal capacity of 3250 mAh) has been prepared. This battery has been charged with the charging current of 0.05 C in the environment at −30° C. The current supply has been stopped at a time point when the voltage of the battery has reached 1.50 V, and the charging has been finished. The relationship between the voltage and the charging time has been obtained in this charging, and a voltage transition curve has been obtained. A result thereof has been illustrated in FIG. 4.

The battery for which the charging has been finished has then been discharged with a discharge current of 1 A until the voltage of the battery becomes 0.6 V, in the environment at −30° C. A relationship between the voltage of the battery and a discharge capacity at this time has been illustrated in FIG. 5.

(ii) Example 2

The voltage transition curve and the relationship between the voltage of the battery and the discharge capacity have been obtained similarly to Example 1, except the charging and the discharging performed in the environment at −20° C. A result thereof has also been illustrated in FIGS. 4 and 5.

(iii) Consideration

Figure 4:
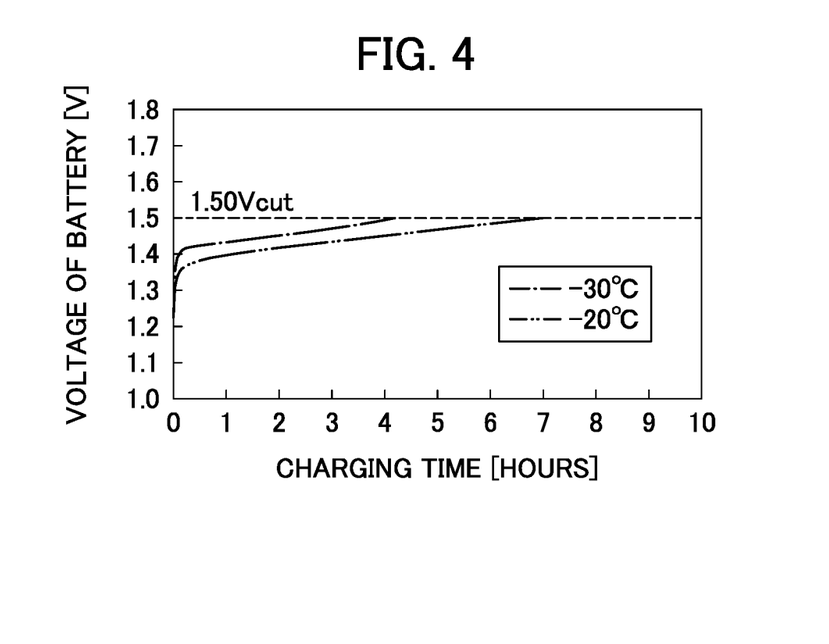
FIG. 4 is a graph illustrating the relationship between the voltage of the battery and the charging time in the charging in the environments at −30° C. and −20° C.

As can be seen in FIG. 4, in the voltage transition curves in Examples 1 and 2, the charging has been finished before the fourth stage corresponding to the final charging stage.

Figure 5:
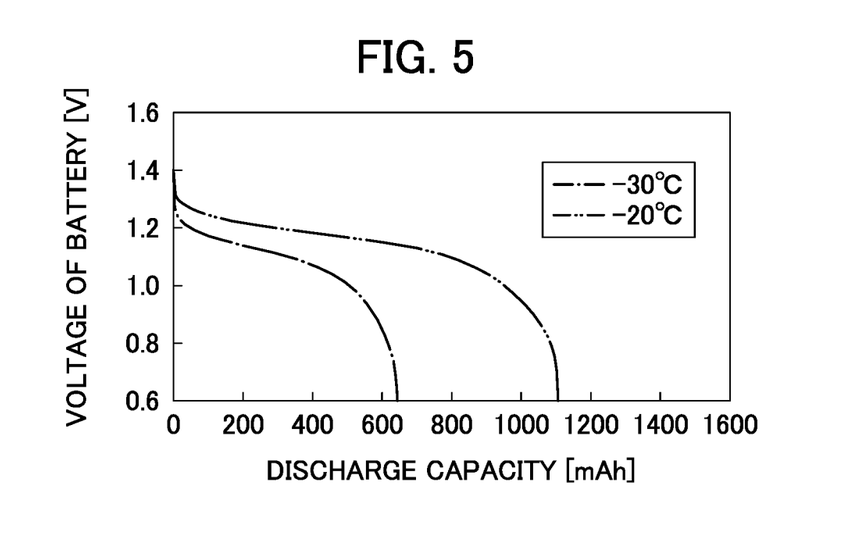
FIG. 5 is a graph illustrating a relationship between the voltage of the battery and a discharge capacity in the charging in the environments at −30° C. and −20° C.

As can be seen in FIG. 5, the discharge capacity after the charging and the discharging in the environment at −20° C. in Example 2 can secure approximately 1100 mAh, and even the discharge capacity after the charging and the discharging in the environment at −30° C. in Example 1 can secure approximately 650 mAh.

Accordingly, it can be said that even the charging, which is finished at the time point when the specified voltage value (1.50 V) has been reached before the final charging stage, can secure the certain level of the capacity for use of the battery.

(3) Cycle Test in Low-Temperature Environment

(i) Example 3

The nickel-metal-hydride storage battery of ⅘ SC size (with the nominal capacity of 3250 mAh) has been prepared.

First, the mass of the prepared battery has been measured to obtain an initial mass value.

Next, this battery has been charged with a charging current of 0.163 A in the environment at −20° C. The current supply has been stopped at the time point when the voltage of the battery has reached 1.50 V, and the charging has been finished. The battery has then been left for an hour to be put into a rest state. Then, in the environment at −20° C., the discharging has been performed with the discharge current of 1 A for 90 minutes, and the battery has been left for an hour to be put into the rest state.

Here, a voltage transition curve has been obtained from the relationship between the voltage of the battery and the charging time in the above described charging. This voltage transition curve has been illustrated in FIG. 6.

A cycle of the charging and the discharging as described above has been used as one cycle to repeat the charging and the discharging. The mass of the battery has been measured at the end of each cycle to obtain a mass value in each cycle. Then, the mass value in each cycle has been subtracted from the initial mass value to obtain a mass decrement in each cycle.

Figure 7:
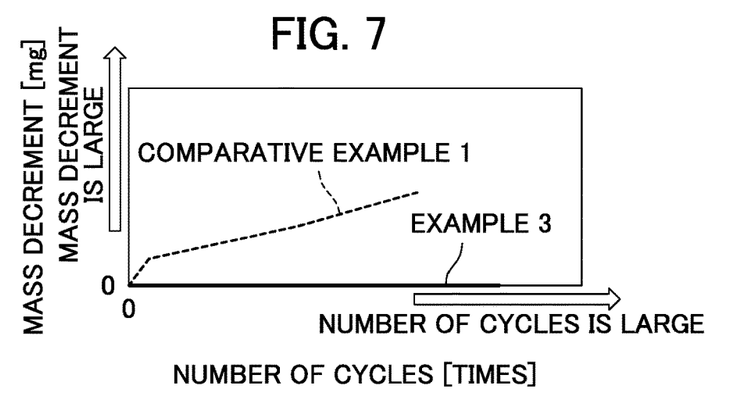
FIG. 7 is a graph illustrating a relationship between mass decrement and the number of cycles according to the batteries in Example 3 and Comparative Example 1.

A relationship between the mass decrement of the battery and the number of cycles has been obtained, and a result thereof has been illustrated in FIG. 7.

(ii) Comparative Example 1

A cycle test has been performed similarly to Example 3 except that the charging has been finished at a time point when 20 hours have elapsed since the start of the charging, instead of the charging being finished through the stop of the current supply at the time point when the voltage of the battery has reached 1.50 V. Here, a voltage transition curve in Comparative Example 1 has been illustrated in FIG. 8. Moreover, a result of the mass decrement of the battery in Comparative Example 1 has also been illustrated in FIG. 7.

(iii) Consideration

Figure 6:
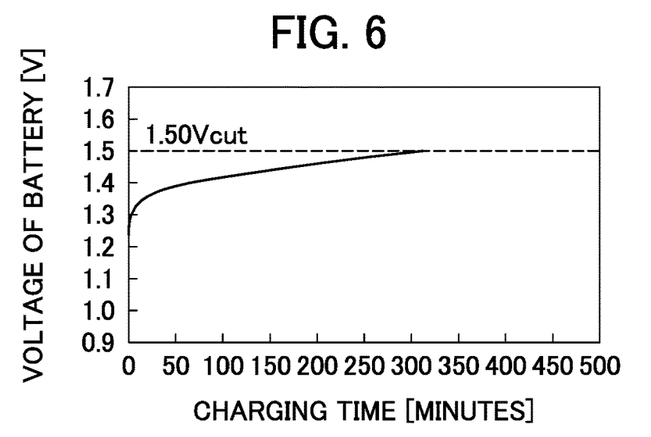
FIG. 6 is a graph illustrating the relationship between the voltage of the battery and the charging time according to the battery in Example 3.

As can be seen in FIG. 6, in the voltage transition curve in Example 3, the charging has been finished before the fourth stage corresponding to the final charging stage, and the battery in Example 3 has not been charged to the maximum capacity that can be stored in the battery.

Figure 8:
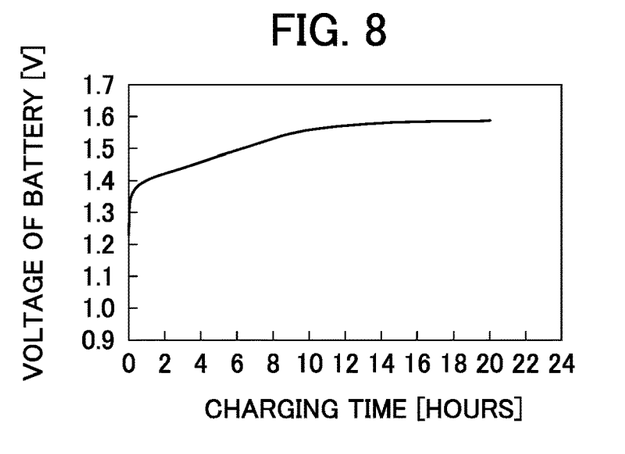
FIG. 8 is a graph illustrating the relationship between the voltage of the battery and the charging time according to the battery in Comparative Example 1.

In contrast, in FIG. 8, in the voltage transition curve in Comparative Example 1, the charging has been continued to the fourth stage corresponding to the final charging stage, and the battery in Comparative Example 1 can be considered to be charged to the maximum capacity that can be stored in the battery.

Next, as can be seen in FIG. 7, the battery in Example 3 has the mass decrement of 0 mg, and the mass decrease of the battery has not occurred. A possible reason is that since the battery in Example 3 has not been charged to the maximum capacity that can be stored in the battery, the charging has been finished before the significant increase in the gas pressure within the battery, and thus the gas emission valve has not been actuated and the alkaline electrolyte solution has not been ejected to the outside.

In contrast, as can be seen, the mass decrement of the battery in Comparative Example 1 increases as the number of cycles increases, and the mass decrease of the battery has occurred. A possible reason is that since the battery in Comparative Example 1 has been charged to the maximum capacity that can be stored in the battery, the significant increase in the gas pressure has been occurred within the battery, and thus the gas emission valve has been actuated and the alkaline electrolyte solution has been ejected to the outside. In other words, as can be seen, if charge control of performing the charging until the battery has been considered to be charged to the maximum capacity that can be stored in the battery is also performed in the low-temperature environment as in the conventional case, the leakage of the alkaline electrolyte solution occurs and the life of the battery is also shortened.

As can be seen from the above description, in the charging in the low-temperature environment, charge control of stopping the charging at the time point when the specified voltage value has been reached can prevent the leakage of the alkaline electrolyte solution to extend the life of the battery, and is thus suitable for the charging in the low-temperature environment. Accordingly, the charge control method according to the present disclosure switches between the charging methods depending on the battery temperature, such that the charge control of performing the charging until the battery has been considered to be charged to the maximum capacity that can be stored in the battery is performed in the environment of the temperature equal to or higher than 0° C., and that the charge control of stopping the charging at the time point when the specified voltage value has been reached is performed in the low-temperature environment of the temperature less than 0° C. The charge control method according to the present disclosure can thus be said to be a superior charge control method that can accommodate the charging in the temperature range wider than the conventional case.

It should be noted that the present invention is not limited to the above described embodiment and examples, and different kinds of variations are possible. The alkaline storage battery may be a nickel-cadmium storage battery in addition to the nickel-metal-hydride storage battery.

<Aspects of the Present Disclosure>

The first aspect of the present disclosure is a charge control method for an alkaline storage battery, including a temperature determination step of determining whether or not a temperature T of a battery is less than 0° C.; a first charging step of, if it is determined in the temperature determination step that the temperature T is equal to or higher than 0° C., supplying a constant current to the battery to charge the battery; a full charge determination step of determining whether or not the battery being charged in the first charging step has been considered to be charged to a maximum capacity that can be stored in the battery; a second charging step of, if it is determined in the temperature determination step that the temperature T is less than 0° C., supplying the constant current to the battery to charge the battery; and a specified voltage value determination step of determining whether or not a voltage value of the battery being charged in the second charging step has reached a specified voltage value, the specified voltage value having been preset in a range lower than the voltage value when the battery has been considered to be charged to the maximum capacity that can be stored in the battery, wherein if it is determined in the full charge determination step that the battery has not been considered to be charged to the maximum capacity that can be stored in the battery, the method returns to the temperature determination step to determine the temperature T again, and if it is determined that the battery has been considered to be charged to the maximum capacity that can be stored in the battery, the method stops the current supply to finish the charging; and if it is determined in the specified voltage value determination step that the voltage value of the battery has not reached the specified voltage value, the method returns to the temperature determination step to determine the temperature T again, and if it is determined that the voltage value of the battery has reached the specified voltage value, the method stops the current supply to finish the charging.

The second aspect of the present disclosure is a charger for an alkaline storage battery, including a temperature measurement unit that measures a temperature of a battery; a voltage measurement unit that measures a voltage of the battery; a power source unit that supplies a current for charging to the battery; and a control unit that controls operations of the power source unit, wherein the control unit performs processes of determining whether or not a temperature T of the battery is less than 0° C., based on information on the temperature T measured by the temperature measurement unit; if it is determined that the temperature T is equal to or higher than 0° C., sending an instruction to the power source unit to supply a constant current to the battery so as to cause the power source unit to charge the battery, and determining whether or not the battery has been considered to be charged to a maximum capacity that can be stored in the battery; if it is determined that the battery has not been considered to be charged to the maximum capacity that can be stored in the battery, determining again whether or not the temperature T is less than 0° C.; if it is determined that the battery has been considered to be charged to the maximum capacity that can be stored in the battery, sending an instruction to the power source unit to stop the current supply; if it is determined that the temperature T is less than 0° C., sending the instruction to the power source unit to supply the constant current to the battery so as to cause the power source unit to charge the battery, and determining whether or not a voltage value of the battery measured by the voltage measurement unit has reached a specified voltage value, the specified voltage value having been preset in a range lower than the voltage value when the battery has been considered to be charged to the maximum capacity that can be stored in the battery; if it is determined that the voltage value of the battery has not reached the specified voltage value, determining again whether or not the temperature T is less than 0° C.; and if it is determined that the voltage value of the battery has reached the specified voltage value, sending the instruction to the power source unit to stop the current supply.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charge control method for an alkaline storage battery, comprising:
    a temperature determination step of determining whether or not a temperature T of the battery is less than 0° C.;
    a first charging step of, if it is determined in the temperature determination step that the temperature T is equal to or higher than 0° C., supplying a constant current to the battery to charge the battery;

a full charge determination step of determining whether or not the battery being charged in the first charging step has been considered to be charged to a maximum capacity that can be stored in the battery;

a second charging step of, if it is determined in the temperature determination step that the temperature T is less than 0° C., supplying the constant current to the battery to charge the battery; and a specified voltage value determination step of determining whether or not a voltage value of the battery being charged in the second charging step has reached a specified voltage value, the specified voltage value having been preset in a range lower than a voltage value when the battery has been considered to be charged to the maximum capacity that can be stored in the battery, wherein:

if it is determined in the full charge determination step that the battery has not been considered to be charged to the maximum capacity that can be stored in the battery, the method returns to the temperature determination step to determine the temperature T again, and if it is determined that the battery has been considered to be charged to the maximum capacity that can be stored in the battery, the method stops supplying current to finish the charging; and if it is determined in the specified voltage value determination step that the voltage value of the battery has not reached the specified voltage value, the method returns to the temperature determination step to determine the temperature T again, and if it is determined that the voltage value of the battery has reached the specified voltage value, the method stops supplying current to finish the charging.

2. A charger for an alkaline storage battery, comprising:

a temperature measurement unit that measures temperature of the battery;

a voltage measurement unit that measures voltage of the battery;

a power source unit that supplies a current for charging to the battery; and a control unit that controls operations of the power source unit, wherein the control unit performs processes of:

determining whether or not a temperature T of the battery is less than 0° C., based on information on the temperature measured by the temperature measurement unit;

if it is determined that the temperature T is equal to or higher than 0° C., sending an instruction to the power source unit to supply a constant current to the battery so as to cause the power source unit to charge the battery, and determining whether or not the battery has been considered to be charged to a maximum capacity that can be stored in the battery;

if it is determined that the battery has not been considered to be charged to the maximum capacity that can be stored in the battery, determining again whether or not the temperature T is less than 0° C.;

if it is determined that the battery has been considered to be charged to the maximum capacity that can be stored in the battery, sending an instruction to the power source unit to stop supplying current;

if it is determined that the temperature T is less than 0° C., sending the instruction to the power source unit to supply the constant current to the battery so as to cause the power source unit to charge the battery, and determining whether or not a voltage value of the battery measured by the voltage measurement unit has reached a specified voltage value, the specified voltage value having been preset in a range lower than a voltage value when the battery has been considered to be charged to the maximum capacity that can be stored in the battery;

if it is determined that the voltage value of the battery has not reached the specified voltage value, determining again whether or not the temperature T is less than 0° C.; and if it is determined that the voltage value of the battery has reached the specified voltage value, sending the instruction to the power source unit to stop supplying current.

* * * * *